(12) United States Patent
Lakshminarayanan

(10) Patent No.: US 10,068,084 B2
(45) Date of Patent: Sep. 4, 2018

(54) METHOD AND SYSTEM OF LOCATION-AWARE CERTIFICATE BASED AUTHENTICATION

(75) Inventor: Sitaraman Suthamali Lakshminarayanan, Dunwoody, GA (US)

(73) Assignee: General Electric Company, Schenectady, NY (US)

( * ) Notice: Subject to any disclaimer, the term of this patent is extended or adjusted under 35 U.S.C. 154(b) by 664 days.

(21) Appl. No.: 13/169,471

(22) Filed: Jun. 27, 2011

(65) Prior Publication Data

US 2012/0328101 A1 Dec. 27, 2012

(51) Int. Cl.
*H04L 29/06* (2006.01)
*G06F 21/44* (2013.01)

(52) U.S. Cl.
CPC ........ *G06F 21/445* (2013.01); *H04L 63/0823* (2013.01); *H04L 63/107* (2013.01);
(Continued)

(58) Field of Classification Search
CPC ........... G06F 21/445; G06F 2221/2111; G06F 2221/2115; H04L 63/0823; H04L 63/107
(Continued)

(56) References Cited

U.S. PATENT DOCUMENTS 5,659,617 A * 8/1997 Fischer ................. H04L 9/3271
380/258
6,088,450 A * 7/2000 Davis ...................... G06F 21/35
235/380
(Continued)

FOREIGN PATENT DOCUMENTS

CN 101267303 A 9/2008
EP 1582950 10/2005
(Continued)

OTHER PUBLICATIONS

Adams et al.; Internet X.509 Public Key Infrastructure Certificate Management Protocol (CMP); 2005; Retrieved from the Internet <URL: https://tools.ietf.org/html/rfc4210>; pp. 1-95 as printed.*
(Continued)

*Primary Examiner* — Saleh Najjar
*Assistant Examiner* — Michael W Chao
(74) *Attorney, Agent, or Firm* — Parks IP Law LLC

(57) ABSTRACT

In one aspect, a method of mutual certificate authentication between a first device and a second device based on location is described. This embodiment of a method comprises receiving a request from a first device, wherein the request comprises a location of the first device; registering a first public key for the first device in response to the request, wherein the registration associates the first device with the first public key; determining at least one second device that can be accessed by the first device based upon a location of the second device relative to the location of the first device; registering a second public key for the second device, wherein the registration associates the second device with the second public key; sending the second public key to the first device; sending the first public key to the second device; and mutually authenticating the first device to the second device when the first device and the second device are connected.

22 Claims, 8 Drawing Sheets

(52) U.S. Cl.
CPC .............. *G06F 2221/2111* (2013.01); *G06F 2221/2115* (2013.01); *H04Q 2209/40* (2013.01); *H04Q 2209/60* (2013.01)

(58) Field of Classification Search
USPC ........................................................ 380/258
See application file for complete search history.

(56) References Cited

U.S. PATENT DOCUMENTS

| | | | |
|---|---|---|---|
| 6,446,004 B1* | 9/2002 | Cao .................... | G06F 9/445 701/482 |
| 6,819,919 B1* | 11/2004 | Tanaka ................ | G06Q 10/10 342/357.31 |
| 6,970,566 B1 | 11/2005 | Kimura | |
| 6,978,023 B2* | 12/2005 | Dacosta ................ | 380/258 |
| 7,143,284 B2 | 11/2006 | Wheeler et al. | |
| 7,197,556 B1 | 3/2007 | Short et al. | |
| 7,221,949 B2 | 5/2007 | Clough | |
| 7,308,251 B2 | 12/2007 | Karaoguz | |
| 7,330,968 B2 | 2/2008 | Kimura | |
| 7,649,997 B2* | 1/2010 | Alrabady ............ | H04L 63/0428 380/247 |
| 8,045,961 B2* | 10/2011 | Ayed .................... | G08B 1/08 455/41.1 |
| 8,290,506 B1* | 10/2012 | Coverstone ........... | H04W 4/02 370/310.2 |
| 2001/0055394 A1* | 12/2001 | Vanttinen et al. .......... | 380/258 |
| 2002/0016153 A1* | 2/2002 | Sato ................... | H04L 63/0492 455/41.2 |
| 2002/0107008 A1* | 8/2002 | Hendrey ............ | H04W 76/002 455/416 |
| 2003/0126437 A1* | 7/2003 | Wheeler et al. ............ | 713/168 |
| 2003/0216143 A1* | 11/2003 | Roese ................... | G01S 5/02 455/456.1 |
| 2004/0190718 A1* | 9/2004 | Dacosta ................ | 380/247 |
| 2004/0248569 A1* | 12/2004 | Kondou ............ | G06K 19/0723 455/426.1 |
| 2005/0026596 A1 | 2/2005 | Markovitz | |
| 2005/0038876 A1* | 2/2005 | Chaudhuri .......... | G06F 17/3087 709/219 |
| 2005/0059379 A1* | 3/2005 | Sovio ................... | H04L 63/0492 455/411 |
| 2005/0124319 A1 | 6/2005 | Williams | |
| 2005/0221798 A1* | 10/2005 | Sengupta ............ | H04M 1/67 455/411 |
| 2005/0229004 A1* | 10/2005 | Callaghan ................ | 713/185 |
| 2006/0003737 A1* | 1/2006 | Alrabady ............ | H04L 63/0428 455/410 |
| 2006/0022841 A1* | 2/2006 | Hoiness ............ | G01D 4/006 340/870.02 |
| 2006/0085844 A1* | 4/2006 | Buer ................... | H04L 63/068 726/4 |
| 2006/0106836 A1* | 5/2006 | Masugi et al. ............ | 707/101 |
| 2006/0177061 A1* | 8/2006 | Orsini et al. .............. | 380/268 |
| 2007/0030824 A1* | 2/2007 | Ribaudo ............ | G01S 5/0018 370/328 |
| 2007/0037574 A1* | 2/2007 | Libov ................ | H04M 3/42357 455/435.2 |
| 2007/0050314 A1* | 3/2007 | Martin et al. ................. | 705/403 |
| 2007/0055865 A1* | 3/2007 | Kakii ............................ | 713/156 |
| 2007/0096765 A1* | 5/2007 | Kagan ................ | G01R 22/063 455/41.2 |
| 2007/0136796 A1* | 6/2007 | Sanchez ............ | H04L 63/0853 726/5 |
| 2007/0156804 A1* | 7/2007 | Mo .......................... | 709/200 |
| 2007/0174243 A1* | 7/2007 | Fritz .................... | G06F 17/3087 |
| 2007/0184817 A1* | 8/2007 | Karaoguz ...................... | 455/411 |
| 2007/0194882 A1* | 8/2007 | Yokota et al. .............. | 340/5.61 |
| 2007/0294645 A1* | 12/2007 | Medvinsky ............ | G06F 21/10 715/862 |
| 2008/0077336 A1* | 3/2008 | Fernandes ................. | 702/57 |
| 2008/0137859 A1* | 6/2008 | Jagadeesan et al. .......... | 380/270 |
| 2008/0209515 A1* | 8/2008 | Ibrahim ............ | G06F 21/6218 726/3 |
| 2008/0228654 A1* | 9/2008 | Edge .............................. | 705/71 |
| 2008/0250147 A1* | 10/2008 | Knibbeler ........... | H04L 63/0492 709/229 |
| 2009/0187492 A1* | 7/2009 | Hammad ............. | G06Q 10/087 705/26.1 |
| 2009/0228983 A1* | 9/2009 | Qin et al. ........................ | 726/26 |
| 2009/0254975 A1* | 10/2009 | Turnbull ............. | H04L 63/0492 726/3 |
| 2009/0265775 A1* | 10/2009 | Wisely ................ | H04L 63/0492 726/9 |
| 2009/0292920 A1* | 11/2009 | Willey .......................... | 713/169 |
| 2010/0274859 A1* | 10/2010 | Bucuk .................... | H04L 63/08 709/206 |
| 2010/0278345 A1* | 11/2010 | Alsina ................. | H04L 63/0492 380/283 |
| 2010/0332668 A1* | 12/2010 | Shah ........................ | H04W 4/02 709/229 |
| 2011/0046792 A1* | 2/2011 | Imes ........................ | H04L 67/42 700/278 |
| 2011/0055561 A1* | 3/2011 | Lai et al. ........................ | 713/168 |
| 2011/0093710 A1* | 4/2011 | Galvin .................. | H04L 63/061 713/169 |
| 2011/0115642 A1* | 5/2011 | Gilbert ................ | G01R 22/066 340/870.02 |
| 2011/0137803 A1* | 6/2011 | Willins ................ | G06Q 10/107 705/67 |
| 2011/0138183 A1* | 6/2011 | Reddy et al. .................. | 713/169 |
| 2011/0202755 A1* | 8/2011 | Orsini et al. ................... | 713/151 |
| 2011/0246766 A1* | 10/2011 | Orsini et al. ................... | 713/160 |
| 2012/0062389 A1* | 3/2012 | Solomon .................. | H04Q 9/00 340/870.03 |
| 2012/0062390 A1* | 3/2012 | Solomon .................. | H04Q 9/00 340/870.03 |
| 2012/0166818 A1* | 6/2012 | Orsini et al. ................... | 713/193 |
| 2012/0331088 A1* | 12/2012 | O'Hare et al. ................. | 709/214 |
| 2015/0195394 A1* | 7/2015 | Bietz ................... | H04M 1/7253 455/419 |

FOREIGN PATENT DOCUMENTS

| | | |
|---|---|---|
| EP | 1582950 A2 | 10/2005 |
| JP | 2002016592 A1 | 1/2002 |
| JP | 2005318538 A1 | 11/2005 |
| JP | 2008311696 A1 | 12/2008 |

OTHER PUBLICATIONS

EP Search Report issued in connection with corresponding EP Patent Application No. 12172793.7 dated Aug. 8, 2013.
Chinese office action in corresponding Chinese Application No. 201210214845.1 dated Apr. 22, 2016.

* cited by examiner

METHOD AND SYSTEM OF LOCATION-AWARE CERTIFICATE BASED AUTHENTICATION

BACKGROUND OF THE INVENTION

The subject matter disclosed herein relates to security and, in particular, to mutual certificate authentication between a first device and a second device based on location of the first device relative to the second device.

In many instances, varieties of devices for the utility industry are deployed on pole tops, in manholes, in substations and other locations that are used to collect data, send data, perform grid operations, etc. Most of these devices either have their locations stored in database repositories or are now equipped with location devices such as GPS receivers and the like. While such devices are generally operated from a central place, in many instances it is desired that the devices can be operated with a handheld device proximate to the device. However, it is desired that this access be secure in order to protect the data as well as the system that the utility device operates on.

Securing messages between distributed software applications such as software applications residing on a utility device and on a handheld device typically requires the usage of Public-Private key pair exchanges between the applications. The keys are typically disturbed in a public key infrastructure (PKI) where public keys are bound to their respective user identities by means of a certificate authority (CA). However, in many instances, once authenticated, the applications are able to access one another in accordance with their authentications for an unlimited duration and from any location.

Therefore, systems and methods of performing mutual certificate authentication between a first device and a second device based on the locations of the first and second device relative to one another are desired.

BRIEF DESCRIPTION OF THE INVENTION

Described herein are embodiments of systems and methods for performing mutual certificate authentication between a first device (e.g., a mobile device or a handheld unit) and a second device (e.g., a utility device), where certificates are issued on demand to the first device and the second device, based on the current location of the first device relative to the second device.

In one aspect, a method of mutual certificate authentication between a first device and a second device based on location is described. This embodiment of a method comprises receiving a request from a first device, wherein the request comprises a location of the first device; registering a first public key for the first device in response to the request, wherein the registration associates the first device with the first public key; determining at least one second device that can be accessed by the first device based upon a location of the second device relative to the location of the first device; registering a second public key for the second device, wherein the registration associates the second device with the second public key; sending the second public key to the first device; sending the first public key to the second device; and mutually authenticating the first device to the second device when the first device and the second device are connected.

In another aspect, a method of mutual certificate authentication between a first device and a second device based on location is described. This embodiment of a method comprises sending a request from a first device to a server, wherein the request comprises location information for the first device; generating, by a first software agent residing on the first device, a first public key and a first private key; registering, by the server, the first public key for the first device, wherein the registration associates the first device with the first public key; issuing, by the server, a first certificate to the first device; determining, by the server, at least one second device that is accessible by the first device based on the location of the second device relative to the first device; notifying, by the server, the second device that the first device requests access to the second device; generating, by a second software agent residing on the second device, a second public key and a second private key in response to the notification; registering, by the server, the second public key for the second device, wherein the registration associates the second device with the second public key; issuing, by the server, a second certificate to the second device; sending, by the server, the second public key to the first device; sending, by the server, the first public key to the second device; and mutually authenticating, by the server, the first certificate and the second certificate when the first device and the second device are connected.

In yet another aspect, a system for mutual certificate authentication between a first device and a second device based on location is described. This embodiment of a system comprises a first device, wherein the first device is comprised of at least a first software agent executing on a first processor and a first communications interface, and the first device is configured to determine its location; a second device, wherein the second device is comprised of at least a second software agent executing on a second processor and a second communications interface; a server comprised of at least a memory, a server communications interface and a server processor, wherein the server is configured to communicate with the first device and the second device and wherein the server processor is configured to: receive a request from a first device, wherein the request comprises a location of the first device; register a first public key for the first device in response to the request, wherein the registration associates the first device with the first public key; determine at least one second device that can be accessed by the first device based upon a location of the second device relative to the location of the first device; register a second public key for the second device, wherein the registration associates the second device with the second public key; send the second public key to the first device; send the first public key to the second device; and mutually authenticate the first device to the second device when the first device and the second device are connected.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Figure 1:
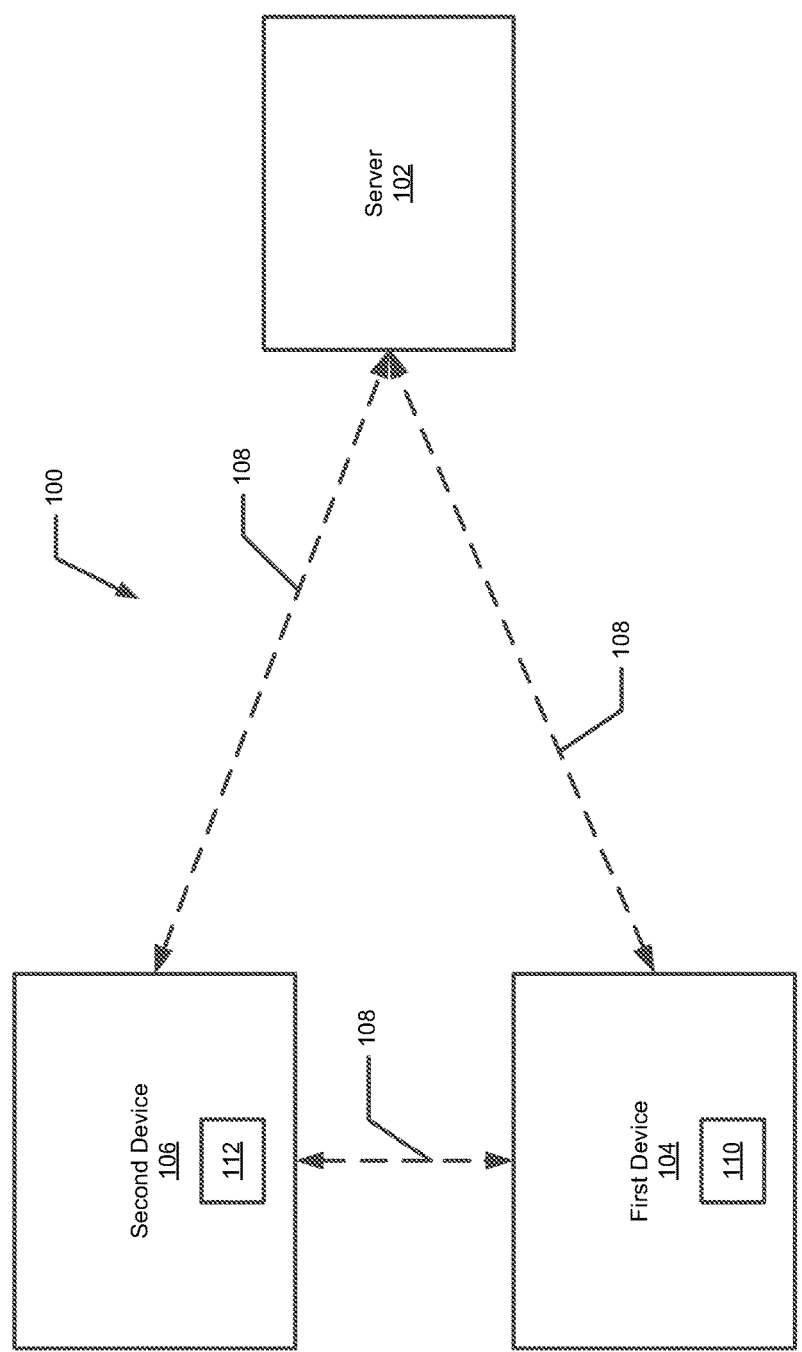
FIG. 1 is an overview illustration of one type of system that would benefit from embodiments of the present invention.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Further, when examples of ranges are provided herein, it is to be appreciated that the given ranges also include all subranges therebetween, unless specifically stated otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In many instances, varieties of devices for the utility industry are deployed on pole tops, in manholes, in substations, and other locations that collect data, send data, perform grid operations, etc. In many instances, the location (e.g., coordinates) of these devices are stored in a database or other computer-accessible central repository or the utility devices are equipped with location devices such as GPS receivers and the like. While most of these utility devices can be operated from a central place, can also be operated with a mobile device (e.g., a handheld device) proximate to the device. Generally, the mobile device accesses or connects to the utility device wirelessly, though wired (including fiber optic) connections are also contemplated within the scope of embodiments of this invention.

Embodiments of the described invention can perform mutual certificate authentication between a first device (e.g. a mobile device or handheld unit) and a second device (e.g., a utility device). Authentication certificates are issued on demand to the first device and the second device, based on the current location of the first device relative to the second device. In one aspect, the certificates may be valid for only a short period of time. When the first device intends to initiate a connection with another utility device in the field, a new certificate is issued to the first device and based on its location, and based on a list of devices the first device is authorized to perform operations on, new certificates are issued to the utility devices within a defined distance of the first device. Once certificates are issued and exchanged, the first device (e.g., mobile device) can authenticate itself to the proximate utility device. Embodiments of this invention help prevent a rogue user from using a different mobile device to gain access utility devices in a different location and helps prevent cascading failure when a mobile device is lost or stolen. Embodiments also prevent a mobile device from accessing utility devices in a different geographic region. Therefore, the technical effect of the described embodiments is to allow access and secure communications between a first device and a second device while the first device and the second device are at or within a pre-defined distance or radius of one another. In one aspect, such access may be limited to a defined duration regardless of the proximity of the first device and the second device.

FIG. 1 illustrates an exemplary distributed system 100 according to one embodiment. The distributed system 100 includes a management server 102. As described in greater detail below, the management server 102 manages the distribution of key pairs among software applications in the system 100. As such, the management server 102 is a PKI management console in one embodiment. In one embodiment, keys are provided to software applications residing on, for example, first device 104 and one or more second devices 106. Though shown as a server 102, the management console can be implemented in a server or other computing device.

The system 100 illustrated in FIG. 1 also includes a communication network 108. The physical media of the network can be wired (including fiber optic), or wireless, or a combination of wired and wireless. The communication network 108 can be any type of communication network now known or later developed. For example, the communication network 108 can be the Internet, a private network, a local area network (LAN) or a wide area network (WAN). It shall be understood that the communication network 108 can include more than one network. For example, the communication network 108 can include a LAN in communication with a WAN in one embodiment. In another embodiment, the communication network 108 can include an internal bus within a single server and any combination of other networks. Such an embodiment may exist in the event that one or more software applications are resident on the same server. In one aspect, the network 108 enables the devices 102, 104, 106 of the exemplary system 100 to connect with one another.

In one aspect, an embodiment of the system 100 can also include one or more resident software applications 110, 112 configured to execute on one or more processors associated with the first device 104 and the second device 106. The software applications 110, 112 are communicatively coupled to the communication network 108 such that they can communicate with one another and the management server 102. In operation, the software application 110 of the first device 104 and the software application 112 of the second device 106 enable the first device 104 and the second device 106 to connect with one another through the network 108. The number of software applications 110, 112 in an embodiment of the system 100 is variable, not limited, and depends on the context. The software applications 110, 112 can all be located on different devices 104, 106 in one embodiment. In another embodiment, at least one software application 110, 112 is located on the same device as another software application.

In one embodiment, one or more of the software applications 110, 112 may need to communicate encrypted information to and receive encrypted information from another one of the software applications 110, 112. In such an embodiment, the software applications 110, 112 need to exchange public keys with one another. It shall be understood the software applications 110, 112 may need to send digitally signed messages to one another. In such a case, and by way of example, software application 110 can register its public key with the management server 102 and then software application 112 can subscribe to that public key. Similarly, and by way of example, software application 112 can register its public key with the management server 102 and then software application 110 can subscribe to that public key. In operation, software application 110 can sign a message sent to software application 112 with its private key and software application 112 can sign a message sent to software application 110 with its private key. Software applications 110, 112 can then verify the signatures using the public keys they received from the management console 102. In one aspect, registering a first public key for the first device 104 comprises the server 102 generating a public/private key pair for the first device 104 and distributing the key pair to the first device 104. In another aspect, registering a first public key for the first device 104 comprises the server 102 receiving the first public key from the first device 104, wherein a software agent 110 residing on the first device 104 generates a public/private key pair for the first device 104. In one aspect, registering a second public key for the second device 106 comprises the server 102 generating a public/private key pair for the second device 106 and distributing the key pair to the second device 106. In another aspect, registering a second public key for the second device 106 comprises the server 102 receiving the second public key from the second device 106, wherein a software agent 112 residing on the second device 106 generates a public/private key pair for the second device 106. In one aspect, the first public key or the second public key are valid only while the first device 104 is located at or within a defined distance of the second device 106. In another aspect, the first public key or the second public key are valid only for a defined period of time.

According to one embodiment, the management server 102 is configured to manage the exchange of keys between software applications 110, 112. As such, in one embodiment the management server 102 is coupled to a central key store that stores public keys for some or all of the software applications 110, 112 and any information associated with the stored public keys. The associated information can include, for example, identification of other software applications residing on devices that are allowed to receive the public key, when the key expires, location (e.g. coordinates) of the device that owns the public key, a defined radius or distance around the device that owns the public key wherein the device can access the public key(s) of other devices at or within that defined distance or radius, and the like. In general, the central key store is a database and can be included within or be a separate entity from the management server 102. For example, the central key store connection with the management server could be through the communications network 108 or directly to (or within) the management server 102 in alternative embodiments. In one embodiment, the central key store is implemented as a database utilizing a lightweight directory access protocol (LDAP).

In one embodiment, the management server 102 can be coupled to a user terminal (not shown) that allows a user (e.g., a system administrator) to provide information to the management server 102. In one embodiment, the system administrator provides the management server 102 with information about particular software applications that can register/store their public key on the management console server or that can use the management console 102 to generate a key pair and store the resulting public key. The generation of key pairs can be implemented in a known manner. In alternative embodiments, the information about particular software applications that can utilize the management server 102 can be received from other sources.

Each software application 110, 112 is also coupled to an application key store. The application key stores can be maintained by any known or later developed keytool, respectively. A keytool is a key and certificate management utility. It enables the software applications 110, 112 to administer their own public/private key pairs and associated certificates for use in self-authentication (where the software application authenticates itself to other software application) or data integrity and authentication services, using digital signatures. It also allows software applications 110, 112 to cache the public keys (optionally, in the form of certificates) of their other software applications. The keytools can be implemented by known methods. As discussed above, the management server 102 can control distribution of the public keys.

Figure 2:
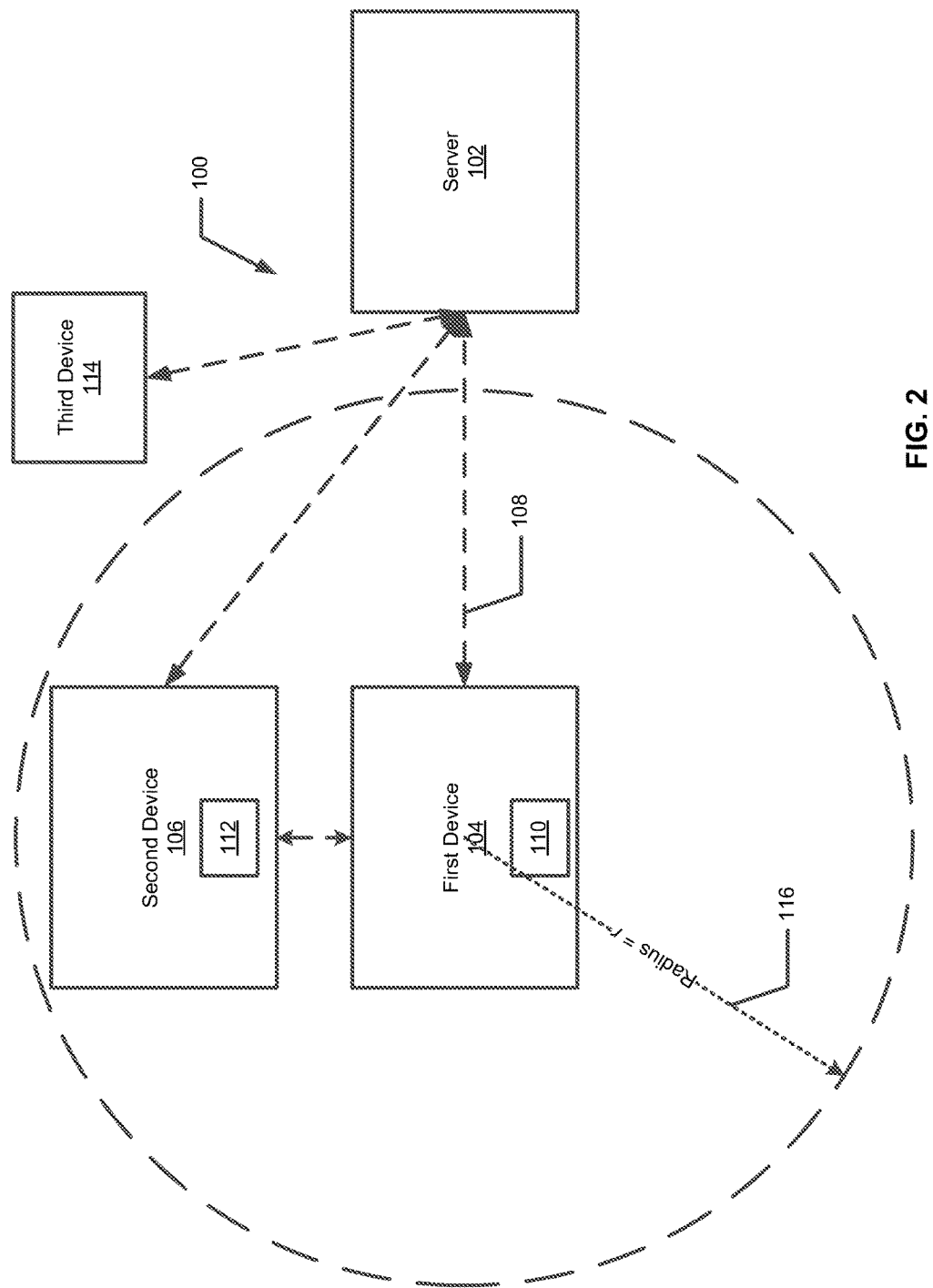
FIG. 2 is another overview illustration of one type of system that would benefit from embodiments of the present invention.

Now referring to FIG. 2, an example of the operation of the system 100 can be informative. Suppose that the first device 104 desires to access a second device 106, wherein the second device is within a pre-defined distance (radius=r) 116 of the first device 104. For example, the first device 104 can be a mobile device such as a hand-held meter-reading device and the second device 106 can be a utility device such as, for example, a utility meter (e.g., a smart meter). And, as non-limiting examples, the pre-define distance or radius (r) can be 50 feet, feet meters, 50 yards, 100 feet, 100 meters, 100 yards, 1000 ft, 1000 meters, 1000 yards, etc., and any distance in-between. Other examples of a utility device can include, for example, a phasor measurement unit, a phasor data concentrator, power quality products, and the like. Other examples of the mobile device can include, for example, field/hand-held devices, laptop computers with GPS capability, mobile phones with GPS capability, tablet devices such as an iPad™ (Apple Inc., Cupertino, Calif.), Cisco Cius™ (Cisco Systems, Inc., San Jose, Calif.), and the like. The first device 104 may send an encrypted message to the second device 106 in order to retrieve data (such as electric consumption information) from the second device 106, and the second device may transmit the data to the first device 104 in an encrypted manner. Therefore, there is a need for a method for mutual certificate authentication between the first device 104 and the second device 106 based on location. One embodiment of the method comprises a server 102 receiving a request from a first device 104, wherein the request also includes a location of the first device. For example, the first device 104 can be equipped with a location determination device such as a GPS receiver, or the like and the location of the first device 104 can be transmitted to the server 102 along with the request. In one aspect, the request is a request to access a second device 106, wherein the second device 106 is within a certain distance or radius 116 of the location of the first device 104. The request can be made to the server 102 over a network 108. In one aspect, at least part of the network 108 can comprise an advanced metering infrastructure (AMI) network. AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The network 108 between the devices 104, 106 and server 102 allows collection and distribution of information to customers, suppliers, utility companies and service providers. This enables these businesses to either participate in, or provide, demand response solutions, products and services. By providing information to customers, the system assists a change in energy usage from their normal consumption patterns, either in response to changes in price or as incentives designed to encourage lower energy usage use at times of peak-demand periods or higher wholesale prices or during periods of low operational systems reliability. In one aspect, the network 108 can comprise at least a portion of a smart grid network. In one aspect, the network 108 can utilize one or more of one or more of a WPAN (e.g., ZigBee, Bluetooth), LAN/WLAN (e.g., 802.11n, microwave, laser, infrared, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, OpenHAN, power line carrier (PLC), broadband over power lines (BPL), and the like.

In response to the request received by the server 102 from the first device 104, the first device 104 registers a first public key for the first device 104 with the server 102, wherein the registration associates the first device 104 with the first public key. In one aspect, registering a first public key for the first device 104 in response to the request comprises the server 102 generating a public/private key pair for the first device 104 and distributing the key pair to the first device 104. In another aspect, registering a first public key for the first device 104 in response to the request comprises the server 102 receiving the first public key from the first device, wherein a software agent 110 residing on the first device 104 generates a public/private key pair for the first device 104.

The server 102 is configured to determine at least one second device 106 that can be accessed by the first device 104 based upon a location of the second device 106 relative to the location of the first device 104. In one aspect, the locations of one or more devices such as second device 106 and third device 114 are stored in a memory associated with the server 102 so that the server 102 can use the location provided by the first device 104 to determine the at least one second device 106 that can be accessed by the first device 104 based upon a location of the second device 106 relative to the location of the first device 104. In another aspect, the server 102 is in communication with devices such as second device 106 and third device 114 via a network 108 and these devices 106, 114 further comprise a location determination device such as a GPS receiver or the like and the devices 106, 114 transmit their locations to the server 102 and the server 102 can use the locations provided by the devices 106, 114 to determine the at least one second device 106 that can be accessed by the first device 104 based upon a location of the second device 106 relative to the location of the first device 104. The server 102 registers a second public key for the second device 106, wherein the registration associates the second device 106 with the second public key. In one aspect, registering a second public key for the second device 106 comprises the server 102 generating a public/private key pair for the second device 106 and distributing the key pair to the second device 106. In another aspect, registering a second public key for the second device 106 comprises the server 102 receiving the second public key from the second device 106, wherein a software agent 112 residing on the second device 106 generates a public/private key pair for the second device 106.

The server 102 sends the second public key to the first device 104 and sends the first public key to the second device 106 over the network 108. As each, the first device 104 and the second device 106 now have the second public key and the first public key, respectively, the first device 104 and the second device mutually authenticate when the first device 104 and the second device 106 are connected. In one aspect, the first public key or the second public key are valid only while the first device 104 is located at or within a defined distance 116 of the second device 106. Therefore, in one aspect, the first device 104 either continuously or intermittently sends its location information to the server 102 so that when the first device 104 is moved to a location outside the pre-define distance or radius (r), then the first public key or the second public key are no longer valid in accordance with PKI protocol and as such, the first device 104 is unable to maintain a connection or communications with the second device 106. In another aspect, the first public key or the second public key are valid only for a defined time period.

Figure 3:
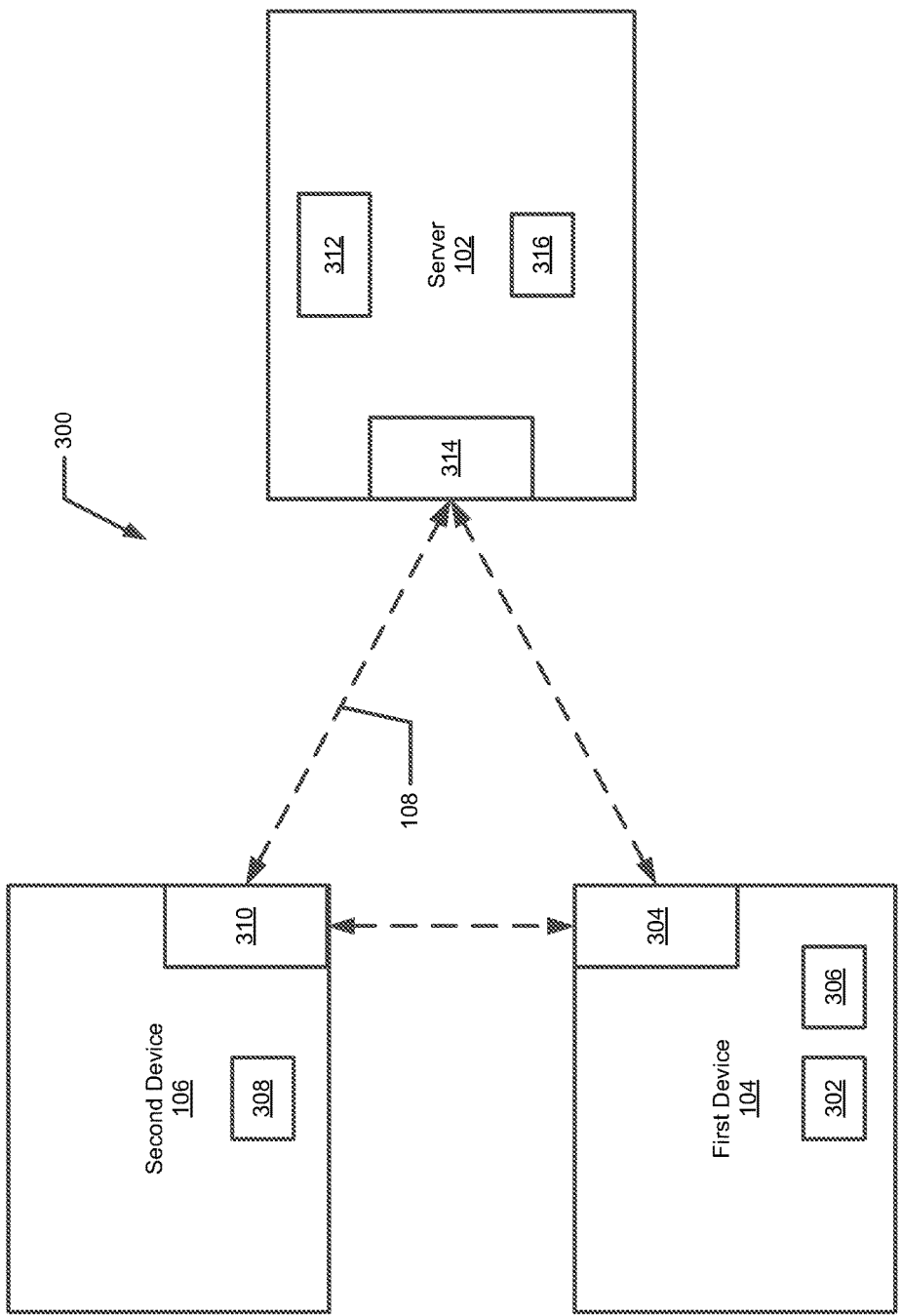
FIG. 3 is an overview illustration of one embodiment of a system for mutual certificate authentication between a first device and a second device based on location.

FIG. 3 is an overview illustration of one embodiment of a system 300 for mutual certificate authentication between a first device 104 and a second device 106 based on location. In one aspect, the first device is a mobile device and the second device is a utility device. In one aspect, the utility device is a utility meter. In other aspects, examples of a utility device can include, for example, a phasor measurement unit, a phasor data concentrator, power quality products, and the like. Other examples of the mobile device can include, for example, field/hand-held devices, laptop computers with GPS capability, mobile phones with GPS capability, tablet devices such as an iPad™ (Apple Inc., Cupertino, Calif.), Cisco Cius™ (Cisco Systems, Inc., San Jose, Calif.), and the like. The illustrated embodiment of a system is comprised of a first device 104. In one aspect, the first device 104 is comprised of at least a first software agent 302 executing on a first processor and a first communications interface 304. In one aspect, the first device 104 is configured to determine its location using a location determination device 306 such as, for example, a GPS receiver, triangulation of a cellular or mobile telephone receiver, or the like. Further comprising the embodiment shown in FIG. 3 is a second device 106. In one aspect, the second device 106 is comprised of at least a second software agent 308 executing on a second processor and a second communications interface 310. The embodiment of a system 300 of FIG. 3 also includes a server 102. In one aspect, the server 102 is comprised of at least a memory 312, a server communications interface 314 and a server processor 316. In one aspect, the server 102 is configured to communicate with the first device 104 and the second device 106 over a network 108. In one aspect, the server processor 316 is configured to receive a request from the first device 104. Included with the request from the first device 104 is a location of the first device 104. The server processor 316 is further configured to register a first public key for the first device 104 in response to the request. The registration associates the first device 104 with the first public key. In one aspect, registering a first public key for the first device 104 in response to the request comprises the server processor 316 generating a public/private key pair for the first device 104 and distributing the key pair to the first device 104. In one aspect, registering a first public key for the first device 104 in response to the request comprises the server 102 receiving the first public key from the first device 104, wherein the first software agent 302 residing on the first device 104 generates a public/private key pair for the first device 104.

The server processor 316 is configured to determine at least one second device 106 that can be accessed by the first device 104 based upon a location of the second device 106 relative to the location of the first device 104 and to register a second public key for the second device 106. The registration associates the second device 106 with the second public key. In one aspect, determining at least one second device 106 that can be accessed by the first device 104 based upon a location of the second device 106 relative to the location of the first device 104 comprises the server processor 316 retrieving stored locations of one or more second devices 106 from a database stored in the memory 312 and comparing the location of the first device 104 to the locations of the one or more second devices 106 to determine whether the second device 106 is at or within a defined distance from the first device 104. In another aspect, the second device 106 is configured to determine its location and determining at least one second device 106 that can be accessed by the first device 104 based upon a location of the second device 106 relative to the location of the first device 104 comprises the server processor 316 receiving location information from the second device 106 and comparing the location of the first device 104 to the location of the second device 106 to determine whether the second device 106 is at or within a defined distance from the first device 104. In one aspect, registering a second public key for the second device 106 comprises the server processor 316 generating a public/private key pair for the second device 106 and distributing the key pair to the second device 106. in another aspect, registering a second public key for the second device 106 comprises the server 102 receiving the second public key from the second device 106, wherein a second software agent 308 residing on the second device 106 generates a public/private key pair for the second device 106. The server processor 316 is further configured to send the second public key to the first device 104; send the first public key to the second device 106; and mutually authenticate the first device 104 to the second device 106 when the first device and the second device are connected. In one aspect, the first public key or the second public key are valid only while the first device 104 is located at or within a defined distance of the second device 106. In another aspect, the first public key or the second public key are valid only for a defined time period.

Figure 4:
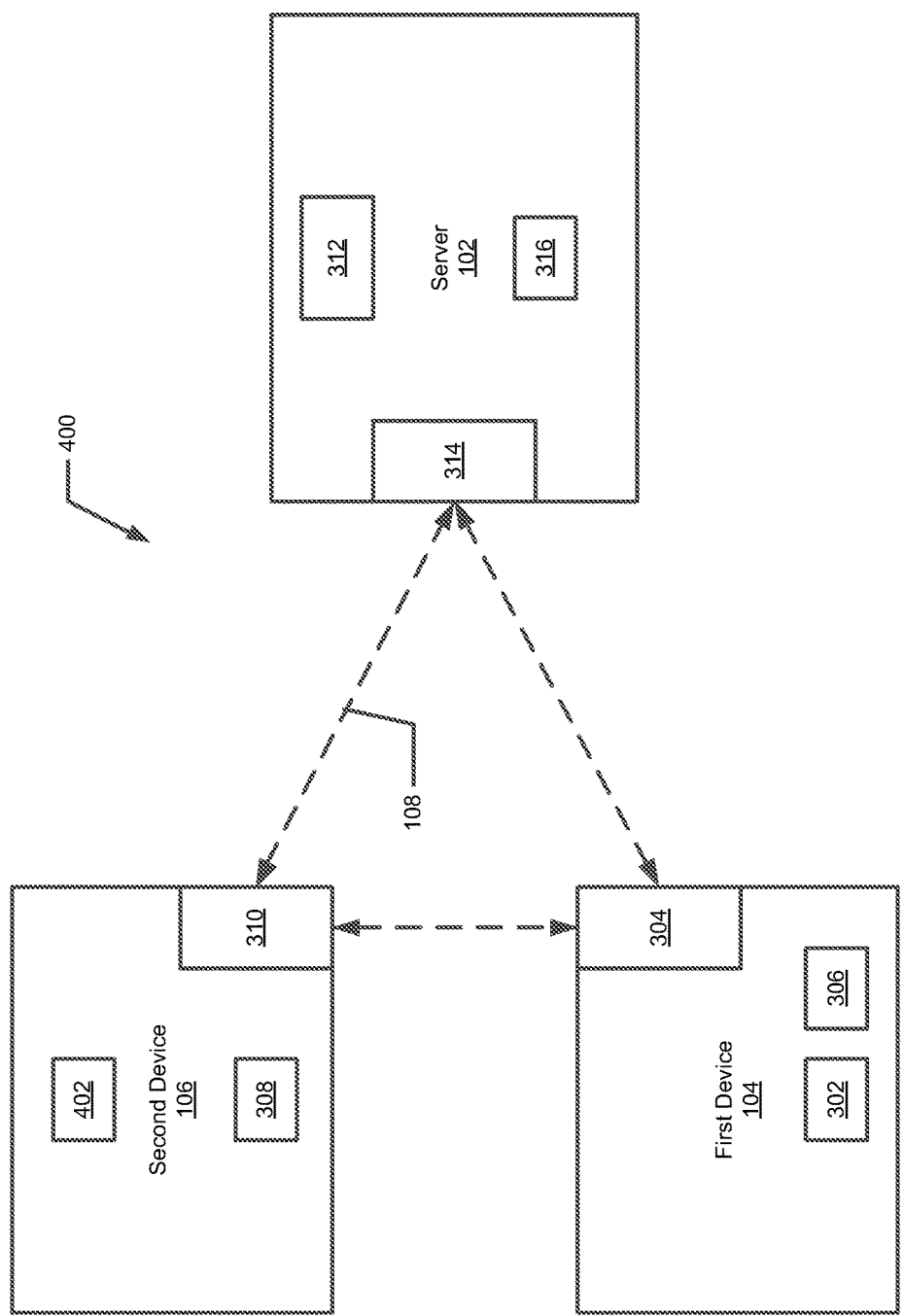
FIG. 4 is an overview illustration of an alternate embodiment of a system for mutual certificate authentication between a first device and a second device based on location.

FIG. 4 is an overview illustration of an alternate embodiment of a system 400 for mutual certificate authentication between a first device 104 and a second device 106 based on location. In this alternate embodiment, the second device 106 is configured to determine its location using a location determination device 402 such as, for example, a GPS receiver, triangulation of a cellular or mobile telephone receiver, or the like. Therefore, when the server processor 316 is determining at least one second device 106 that can be accessed by the first device 104 based upon a location of the second device 106 relative to the location of the first device 104 comprises receiving location information from the second device 106 as determined by the location determination device 402 of the second device 106 and comparing the location of the first device 104 to the location of the second device 106 to determine whether the second device 106 is at or within a defined distance from the first device 104.

Figure 5:
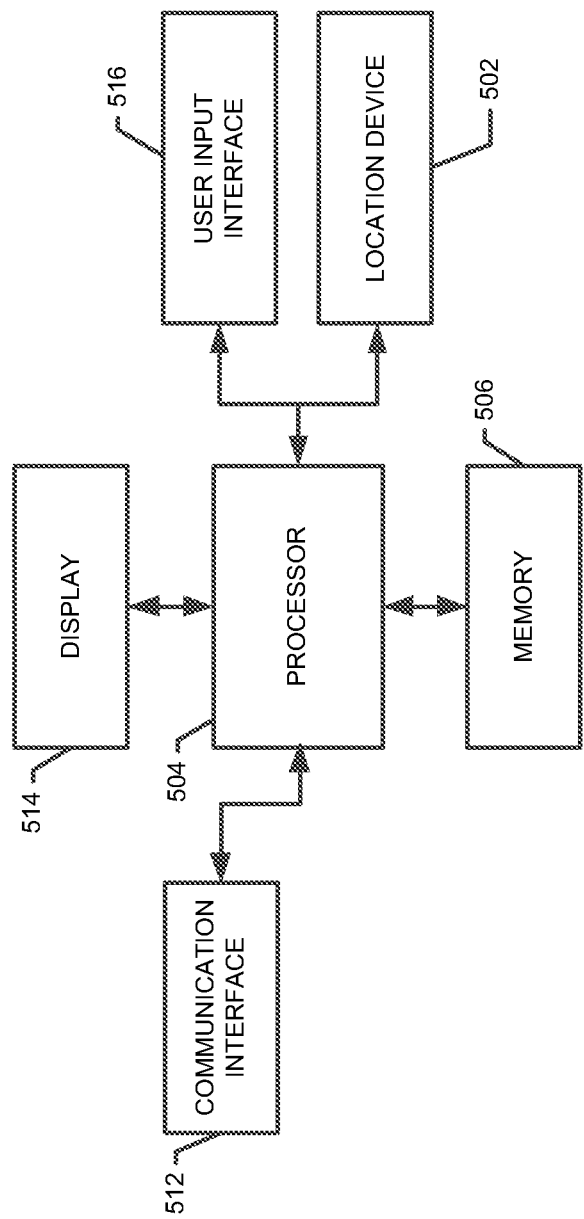
FIG. 5 illustrates a schematic block diagram of an entity capable of operating as one of a first device or second device shown in accordance with one embodiment of the present invention.

Referring now to FIG. 5, a schematic block diagram of entities capable of operating as one of a first device 104 or second device 106 are shown in accordance with one embodiment of the present invention. The entities capable of operating as one of a first device 104 or second device 106 include various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as one of a first device 104 or second device 106 can generally include means, such as one or more processors 504 for performing or controlling the various functions of the entity. In one aspect, the one or more processors can be, for example, one or more of a NEC v850 family microprocessor (NEC Corporation, Tokyo, Japan) and/or a Teridian 6533 controller or a Teridian 6521 controller as are available from Maxim Integrated Products, Inc. (Sunnyvale, Calif.), among others. As shown in FIG. 5, in one embodiment, the one of a first device 104 or second device 106 can comprise a location determination device 502 that can be used to determine the present location of the one of a first device 104 or second device 106. In various aspects, the location determination device 502 can comprise one or more of a GPS (global positioning system) receiver, a cellular or other mobile communications receiver that can be triangulated for location determination, and the like as are known to one of ordinary skill in the art. Further comprising this embodiment of one of a first device 104 or second device 106 are one or more processors 504 and memory 506.

In one embodiment, the one or more processors 504 are in communication with or include memory 506, such as volatile and/or non-volatile memory that stores content, data or the like. For example, the memory 506 may store content transmitted from, and/or received by, the entity. Also for example, the memory 506 may store software applications, instructions or the like for the one or more processors 504 to perform steps associated with operation of the entity in accordance with embodiments of the present invention. In particular, the one or more processors 504 may be configured to perform the processes discussed in more detail herein for determining, using the location determination device 502, a location for the entity; transmitting a request to a separate entity (e.g., server 102), wherein the request is to access a second device that is within a defined distance of the entity. The request includes location information for the entity. In one aspect, the processor 504 can be configured to receive a public/private key pair for the entity that has been created by a separate device such as the server 102 and store the key pair in the memory 506. In another aspect, the processor 504 can be configured to generate a public/private key pair for the entity using a software agent that at least partially resides in the memory 506 and transmit at least the public key to a separate device such as the server 102. The processor 504 can also be configured to receive the public key of a second device and mutually authenticate itself with the second device by receiving an encrypted message from the second device that has been encrypted with the entity's public key and decrypting the message with the entity's private key while concurrently encrypting a message with the second device's public key and transmitting the encrypted message to the second device. In one aspect, the mutual authentication process can involve the use of a trusted intermediary such as the server 102.

In addition to the memory 506, the one or more processors 504 can also be connected to at least one interface or other means for displaying, transmitting and/or receiving data, content or the like. In this regard, the interface(s) can optionally include at least one communication interface 512 or other means for transmitting and/or receiving data, content or the like, as well as at least one user interface that can include a display 514 and/or a user input interface 516. In one aspect, the optional communication interface 512 can be used to transfer data or receive commands from and transfer information to a remote computing device 102 such as the one described herein over a network 108. In one aspect, the network 108 can be an advanced metering infrastructure (AMI) network, as described herein. In one aspect, the communication interface 512 can comprise a wireless communication interface such as a Wi-Fi transceiver. The user input interface 516, in turn, can comprise any of a number of devices allowing the entity to receive data from a user, such as a keypad, a touch display, a joystick or other input device.

Figure 6A:
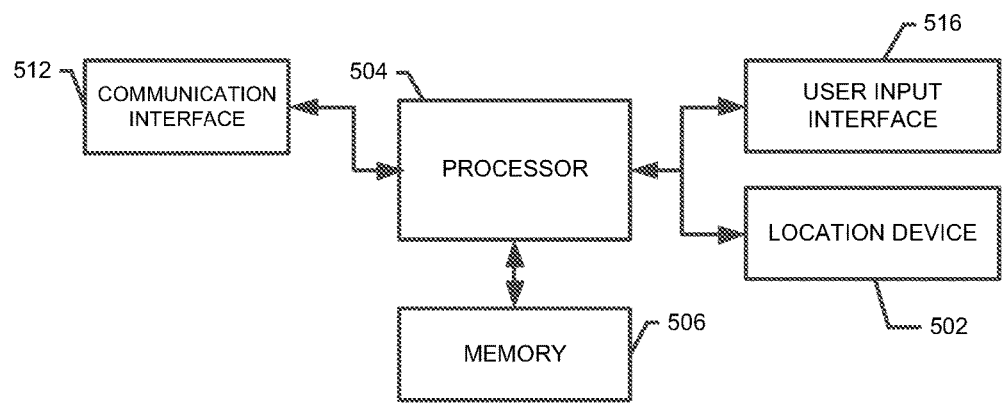
FIGS. 6A and 6B illustrate alternative embodiments of the entity shown in FIG. 5, and illustrate embodiments of a schematic block diagram of entities capable of operating as one of a first device or second device.
Figure 6B:
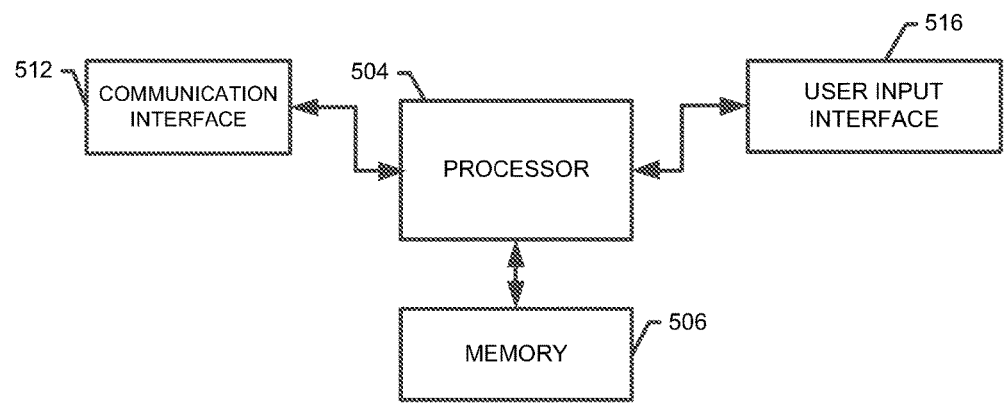

FIGS. 6A and 6B illustrate alternative embodiments of the entity shown in FIG. 5 and illustrate embodiments of a schematic block diagram of entities capable of operating as one of a first device 104 or second device 106. In FIG. 6A, the illustrated entity includes all the elements as describe in FIG. 5A except a display. In FIG. 6B, the illustrated entity includes all the elements as describe in FIG. 5A except a display and a location determination device. In such an embodiment, the location of the entity can be stored in the memory 506 of the entity of an intermittent basis (such as when the entity is moved), or the location information can be stored in the memory of a separate device such as computing device (server) 102.

Figure 7:
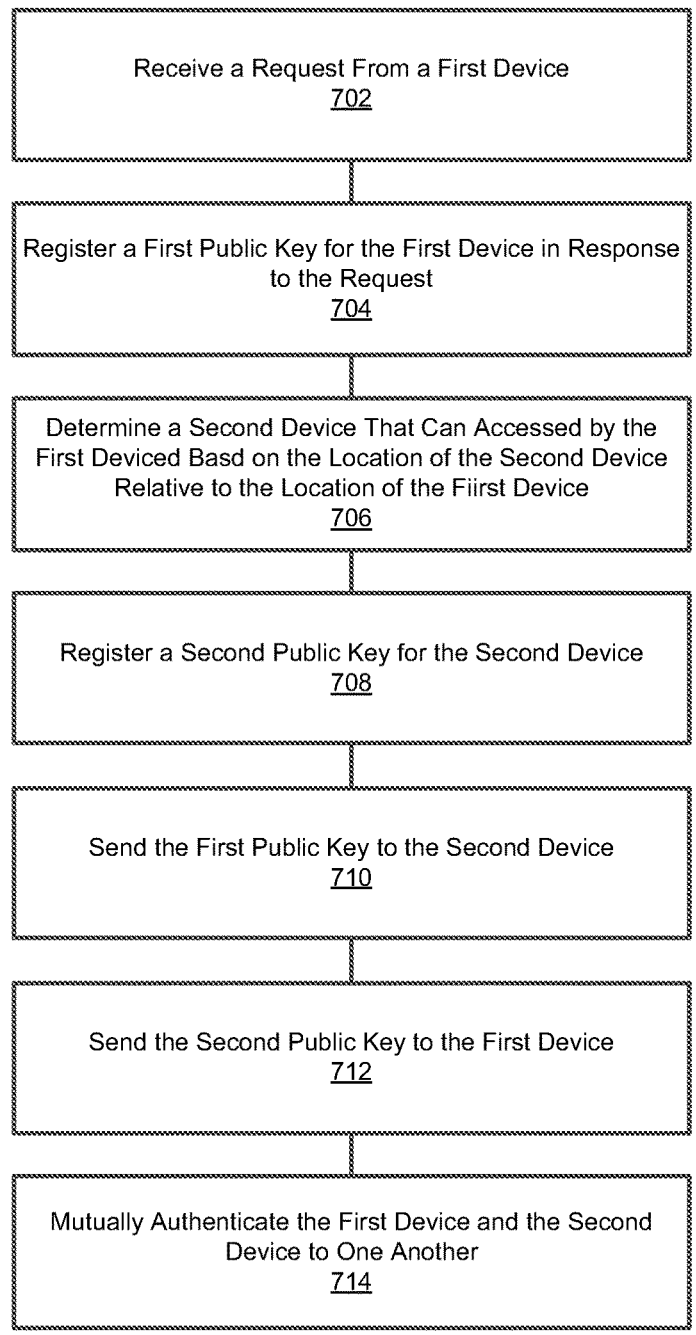
FIG. 7 is a flowchart illustrating a method of practicing an embodiment of the present invention.

FIG. 7 is a flowchart illustrating a method of practicing an embodiment of the present invention. The described method comprises an embodiment of a method for mutual certificate authentication between a first device and a second device based on location. At step 702, a request is received from a first device. In one aspect, the request is accompanied by location information (e.g., coordinates) for the first device. In one aspect, the request is sent from a first device to a server. At step 704, in response to the request, a first public key is registered for the first device. In one aspect, registering a first public key for the first device in response to the request comprises generating a public/private key pair for the first device and distributing the key pair to the first device. In one aspect, the first public key is generated by and distributed from a server to the first device. In another aspect, registering a first public key for the first device in response to the request comprises receiving the first public key from the first device, wherein a software agent residing on the first device generates a public/private key pair for the first device. In one aspect, the first public key is received by a server from the first device. At step 706, at least one second device is determined that can be accessed by the first device based upon a location of the second device relative to the location of the first device. In one aspect, the second device is determined from a plurality of devices. In one aspect, the second device is determined based on it being at or within a defined distance or radius of the first device. In one aspect, determining at least one second device that can be accessed by the first device based upon a location of the second device relative to the location of the first device comprises a server processor retrieving stored locations of one or more second devices from a database stored in a memory associated with the server and comparing the location of the first device to the locations of the one or more second devices to determine whether the second device is at or within a defined distance from the first device. In another aspect, the second device is configured to determine its location and determining at least one second device that can be accessed by the first device based upon a location of the second device relative to the location of the first device comprises the server processor receiving location information from the second device and comparing the location of the first device to the location of the second device to determine whether the second device is at or within a defined distance from the first device. In one aspect, a server notifies the second device that the first device desires to access the second device.

At step 708, a second public key is registered for the second device, wherein the registration associates the second device with the second public key. In one aspect, a second software agent residing on the second device generates a second public key and a second private key in response to a notification that the first device desires to access the second device. In one aspect, the notification is received by the second device from a server. In another aspect, the notification is received by the second device from the first device. In one aspect, registering a second public key for the second device comprises generating a public/ private key pair for the second device and distributing the key pair to the second device. In one aspect, a server generates a public/private key pair for the second device and distributing the key pair to the second device. In another aspect, registering a second public key for the second device comprises receiving the second public key from the second device, wherein a software agent residing on the second device generates a public/private key pair for the second device. In one aspect, the second public key from the second device is received by a server. At step 710, the first public key is sent to the second device and at step 712, the second public key is sent to the first device. At step 714, the first device and the second device are mutually authenticated to one another when they are connected using the first public key and the second public key. In on aspect, the first public key or the second public key are valid only while the first device is located at or within a defined distance of the second device. In one aspect, the first public key or the second public key are valid only for a defined time period.

Figure 8:
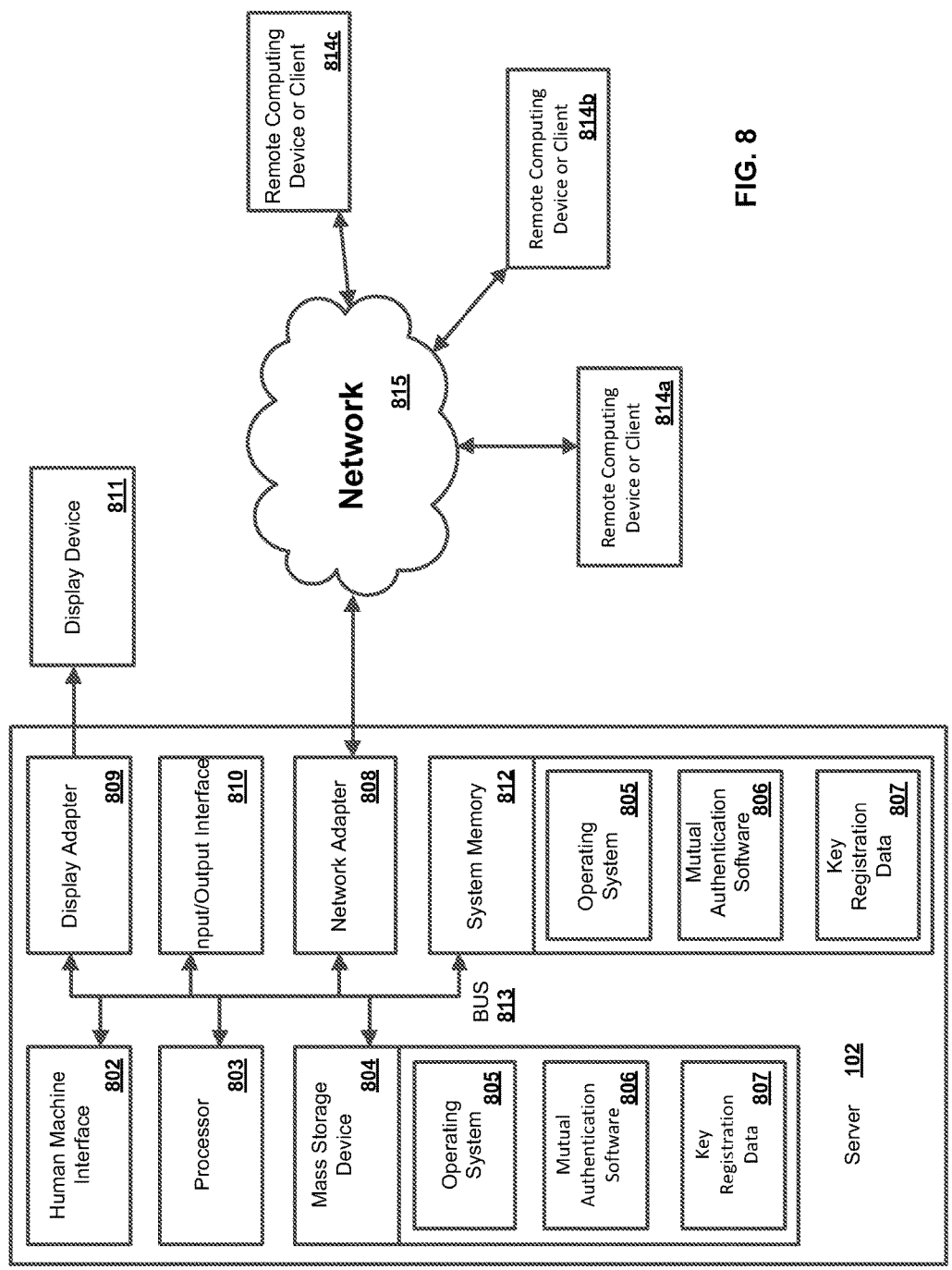
FIG. 8 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit, such as the first device 104, second device 106, server 102 the network 108, etc., can be software, hardware, or a combination of software and hardware. The units can comprise the mutual authentication software 806 as illustrated in FIG. 8 and described below. Reference is now made to FIG. 8, which illustrates one type of electronic device that would benefit from embodiments of the present invention. As shown, the electronic device may be a server 102.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise machine monitoring systems, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a computing device such as server 102. The components of the server 102 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, mutual authentication software 806, key registration data 807, a network adapter 808, system memory 812, an input/output interface 810, a display adapter 809, a display device 811, and a human machine interface 802, can be contained within one or more remote computing devices or clients 814*a,b,c* at physically separate locations, connected through buses of this form, in effect implementing a fully distributed system or distributed architecture.

The server 102 typically comprises a variety of computer readable media. Exemplary readable media can be any available media that is non-transitory and accessible by the server 102 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as key registration data 807 and/or program modules such as operating system 805 and mutual authentication software 806 that are immediately accessible to and/or are presently operated on by the processing unit 803.

For example, the memory 812 may store content transmitted from, and/or received by, the server 102. Also for example, the memory 812 may store software applications, instructions or the like for the one or more processors 803 to perform steps associated with operation of the entity in accordance with embodiments of the present invention. In particular, the one or more processors 803 may be configured to perform the processes discussed in more detail herein for mutual certificate authentication between a first device and a second device based on location comprising receiving a request from a first device, wherein the request comprises a location of the first device; registering a first public key for the first device in response to the request, wherein the registration associates the first device with the first public key; determining at least one second device that can be accessed by the first device based upon a location of the second device relative to the location of the first device;

registering a second public key for the second device, wherein the registration associates the second device with the second public key; sending the second public key to the first device; sending the first public key to the second device; and mutually authenticating the first device to the second device when the first device and the second device are connected.

In another aspect, the server 102 can also comprise other non-transitory, removable/non-removable, volatile/non-volatile computer storage media. By way of example, FIG. 8 illustrates a mass storage device 804 that can provide non-volatile storage of computer code, computer readable instructions, data structures, program modules, and other data for the server 102. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and mutual authentication software 806. Each of the operating system 905 and mutual authentication software 806 (or some combination thereof) can comprise elements of the programming and the mutual authentication software 806. Key registration data 807 can also be stored on the mass storage device 904. Key registration data 807 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the server 102 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the server 102 can have more than one display adapter 809 and the server 102 can have more than one display device 811. For example, a display device can be a monitor, an LCD (Liquid Crystal Display), or a projector. In addition to the display device 811, other output peripheral devices can comprise components such as speakers (not shown) and a printer (not shown), which can be connected to the server 102 via Input/Output Interface 810. Any step and/or result of the methods can be output in any form to an output device. Such output can be any form of visual representation, including, but not limited to, textual, graphical, animation, audio, tactile, and the like.

The server 102 can operate in a networked environment using logical connections to one or more remote computing devices or clients 814a,b,c. By way of example, a remote computing device 814 can be a personal computer, portable computer, a server, a router, a network computer, a vendor or manufacture's computing device, a master station, an electric vehicle charging station (EVCS), peer device or other common network node, and so on. In one aspect, remote computing device 814 can be first device 104 or second device 106 as described herein. Logical connections between the server 102 and a remote computing device or client 814a,b,c can be made via a local area network (LAN) and a general wide area network (WAN). Such network connections can be through a network adapter 808. A network adapter 808 can be implemented in both wired and wireless environments. Such networking environments are conventional and commonplace in offices, enterprise-wide computer networks, intranets, and other networks 815 such as the Internet or an AMI network.

For purposes of illustration, application programs and other executable program components such as the operating system 805 are illustrated herein as discrete blocks, although it is recognized that such programs and components reside at various times in different storage components of the server 102, and are executed by the data processor(s) of the server 102. An implementation of mutual authentication software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 504 discussed above with reference to FIG. 5, 6A or 6B, or the one or more processors 803 discussed above with reference to FIG. 8, to produce a special-purpose machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., such as the one or more processors 504 discussed above with reference to FIG. 5, 6A or 6B, or the one or more processors 803 discussed above with reference to FIG. 8) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for authentication between a first device and a second device, the method comprising:
    using a server comprising a processor;
        receiving, by the server, a request from the first device to access the second device;
        receiving, by the server, a location of the first device;
        receiving, by the server, a location of the second device;
        registering, by the server, a first public key associated with the first device;
        registering, by the server, a second public key associated with the second device;
        comparing, by the server, the location of the first device with the location of the second device;
        issuing, by the server, if the location of the first device is within a predetermined distance from the location of the second device, a first certificate to the first device, wherein the first certificate certifies that the first public key is associated with the first device;
        issuing, by the server, if the location of the first device is within a predetermined distance from the location of the second device, a second certificate to the second device, wherein the second certificate certifies that the second public key is associated with the second device; and
        sending, by the server, if the location of the first device is within a predetermined distance from the location of the second device, the second public key to the first device and the first public key to the second device,
        wherein the first device and the second device are physically separate from the server, and the first device is a mobile device and the second device is a utility device, the utility device is selected from a group consisting of a utility meter, a phasor measurement unit, a phasor data concentrator, and a power quality product.

2. The method of claim 1, wherein the mobile device is selected from the group consisting of a laptop computer with GPS capability, a mobile phone with GPS capability, and a tablet computing device.

3. The method of claim 1, wherein registering the first public key includes generating a first key pair including the first public key and a first private key and distributing the first key pair to the first device.

4. The method of claim 1, wherein registering the first public key comprises receiving the first public key from the first device.

5. The method of claim 1, wherein registering the second public key comprises generating a second key pair including the second public key and a second private key and distributing the second key pair to the second device.

6. The method of claim 1, wherein at least one of the first public key and the second public key is valid only when the first device is located within a predetermined distance of the second device.

7. The method of claim 1, wherein at least one of the first public key and the second public key is valid only for a predetermined time period.

8. A method, comprising:
receiving, by a server comprising a processor, a request from a first device to access a second device;
receiving, by the server, a first public key from the first device;
receiving, by the server, a location information for the first device;
receiving, by the server, a location information for the second device;
receiving, by the server, a second public key from the second device;
determining, by the server, whether the location information of the first device is within a predetermined distance from the location information of the second device, wherein the location information for the second device is previously stored in the server;
issuing, by the server, if the first device is within a predetermined distance from the second device, a first certificate to the first device, wherein the first certificate certifies that the first public key is associated with the first device;
issuing, by the server, if the location information of the first device is within a predetermined distance from the location information of the second device, a second certificate to the second device, wherein the second certificate certifies that the second public key is associated with the second device;
sending, by the server, the second public key to the first device; and
sending, by the server the first public key to the second device,
wherein the first device and the second device are physically separate from the server, and the first device is a mobile device and the second device is a utility device, the utility device is selected from a group consisting of a utility meter, a phasor measurement unit, a phasor data concentrator, and a power quality product.

9. The method of claim 8, wherein the mobile device is selected from the group consisting of a laptop computer with GPS capability, a mobile phone with GPS capability, and a tablet computing device.

10. The method of claim 8, wherein at least one of the first certificate and the second certificate is valid only for a predetermined time period.

11. A system for authentication between a plurality of devices, the system comprising:
a first device;
a second device; and
a server in communication with the first device and the second device, the server having:
a processor; and
a memory comprising instructions that, when executed by the processor, cause the processor to perform operations comprising:
receiving a request from the first device to access the second device;
receiving a location of the first device;
receiving a location of the second device;
registering a first public key associated with the first device;
registering a second public key associated with the second device;
comparing the location of the first device with the location of the second device;
issuing, if the location of the first device is within a predetermined distance from the location of the second device, a first certificate to the first device, wherein the first certificate certifies that the first public key is associated with the first device;
issuing, if the location of the first device is within a predetermined distance from the location of the second device, a second certificate to the second device, wherein the second certificate certifies that the second public key is associated with the second device; and
sending, if the location of the first device is within a predetermined distance from the location of the second device, the second public key to the first device and the first public key to the second device,
wherein the first device and the second device are physically separate from the server, and the first device is a mobile device and the second device is a utility device, the utility device is selected from a group consisting of a utility meter, a phasor measurement unit, a phasor data concentrator, and a power quality product.

12. The system of claim 11, wherein the mobile device is selected from the group consisting of a laptop computer with GPS capability, a mobile phone with GPS capability, and a tablet computing device.

13. The system of claim 11, wherein the first device includes a GPS receiver configured to determine the location of the first device.

14. The system of claim 11, wherein the operation of registering the first public key comprises generating a first key pair including the first public key and a first private key and distributing the first key pair to the first device.

15. The system of claim 11, wherein the operation of registering the first public key comprises receiving the first public key from the first device.

16. The system of claim 11, wherein the operation of registering the second public key comprises generating a second key pair including the second public key and a second private key and distributing the second key pair to the second device.

17. The system of claim 11, wherein the operation of registering the second public key comprises receiving the second public key from the second device.

18. The system of claim 11, wherein at least one of the first public key and the second public key is valid only when the first device is located within a predetermined distance of the second device.

19. The system of claim 11, wherein at least one of the first public key and the second public key is valid only for a predetermined time period.

20. The system of claim 11, wherein the operation of receiving the location of the second device includes retrieving a stored location from a database.

21. The system of claim 11, wherein the second device is configured to determine the location of the second device.

22. A system for authentication between a plurality of devices, the system comprising:
- a first device;
- a second device;
- a server in communication with the first device and the second device, the server comprising
- a processor; and
- a memory comprising instructions that, when executed by the processor, cause the processor to perform operations comprising:
  - receiving a request from a first device to access a second device;
  - receiving a location of the first device from the first device;
  - receiving a first public key from the first device;
  - receiving a second public key from the second device;
  - determining whether the location of the first device is within a predetermined distance from a location of the second device, wherein the location of the second device is received from the second device;
  - issuing, if the location of the first device is within a predetermined distance from the location of the second device, a first certificate to the first device, wherein the first certificate certifies that the first public key is associated with the first device;
  - issuing, by the server, if the location of the first device is within a predetermined distance from the location of the second device, a second certificate to the second device, wherein the second certificate certifies that the second public key is associated with the second device;
  - sending, by the server, the second public key to the first device; and
  - sending, by the server, the first public key to the second device,
- wherein the first device and the second device are physically separate from the server, and the first device is a mobile device and the second device is a utility device, the utility device is selected from a group consisting of a utility meter, a phasor measurement unit, a phasor data concentrator, and a power quality product.

* * * * *